M. M. BARNES.
MOTOR.
APPLICATION FILED APR. 11, 1913.

1,102,636.

Patented July 7, 1914.
2 SHEETS—SHEET 1.

Witnesses

Inventor
M. M. Barnes
By
Attorneys

M. M. BARNES.
MOTOR.
APPLICATION FILED APR. 11, 1913.
1,102,636.
Patented July 7, 1914.
2 SHEETS—SHEET 2.
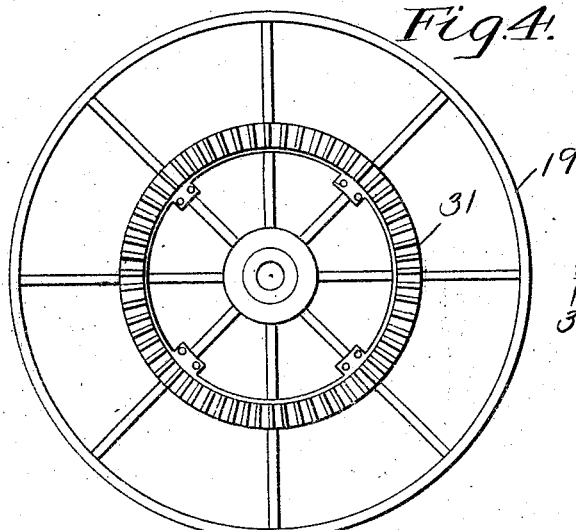
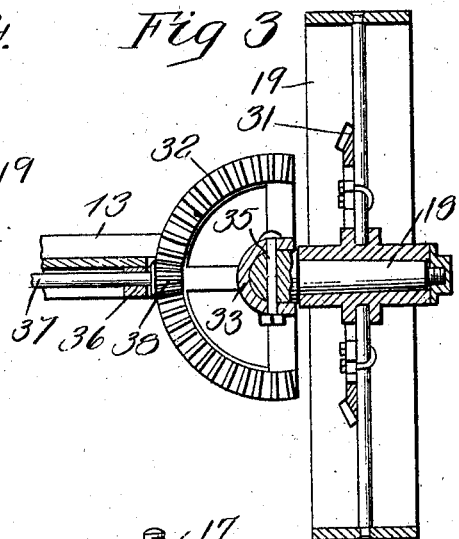
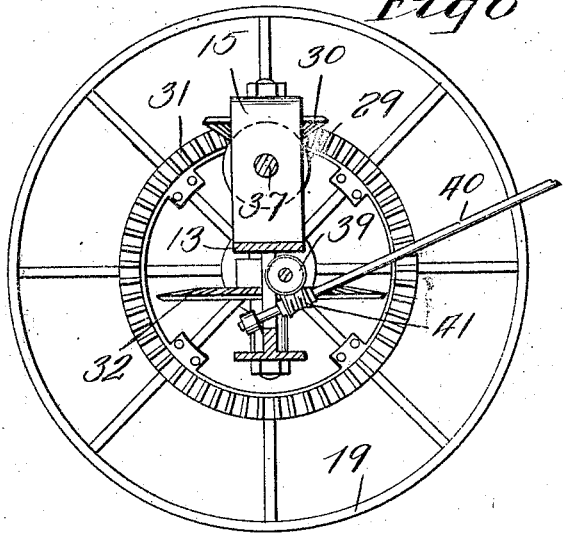
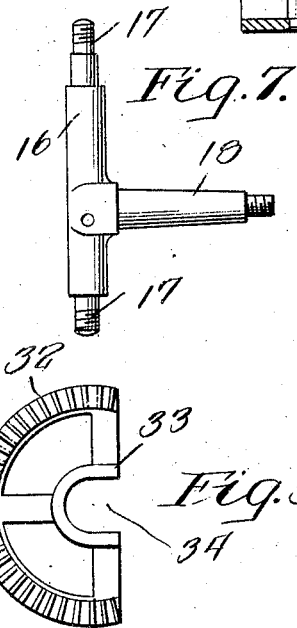
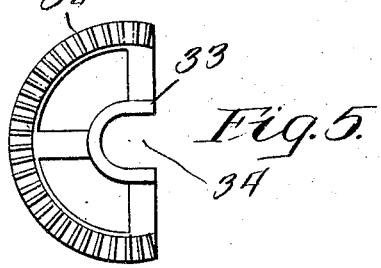
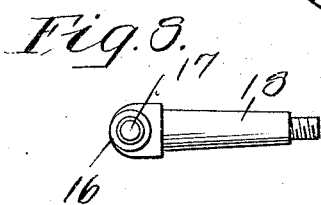
Witnesses
Inventor
M. M. Barnes
By
Attorneys

UNITED STATES PATENT OFFICE.

MARION M. BARNES, OF LOVILIA, IOWA.

MOTOR.

1,102,636.  Specification of Letters Patent. Patented July 7, 1914.

Application filed April 11, 1913. Serial No. 760,495.

*To all whom it may concern:*

Be it known that I, MARION M. BARNES, a citizen of the United States, residing at Lovilia, in the county of Monroe, State of Iowa, have invented certain new and useful Improvements in Motors; and I do hereby declare the following to be a full, clear, and exact description of the invention, such as will enable others skilled in the art to which it appertains to make and use the same.

This invention relates to tractors such as are used on farms, roads and other like places for hauling, plowing, cultivating and the like.

The principal object of the invention is to improve the general construction of devices of this character.

A second object of the invention is to provide an improved means for driving the front or steering wheels of such an engine.

A third object of the invention is to provide an improved steering mechanism for such an engine.

With the above and other objects in view the invention consists in general of certain novel details of construction and combination of parts hereinafter fully described, illustrated in the accompanying drawings, and specifically claimed.

Figure 1:
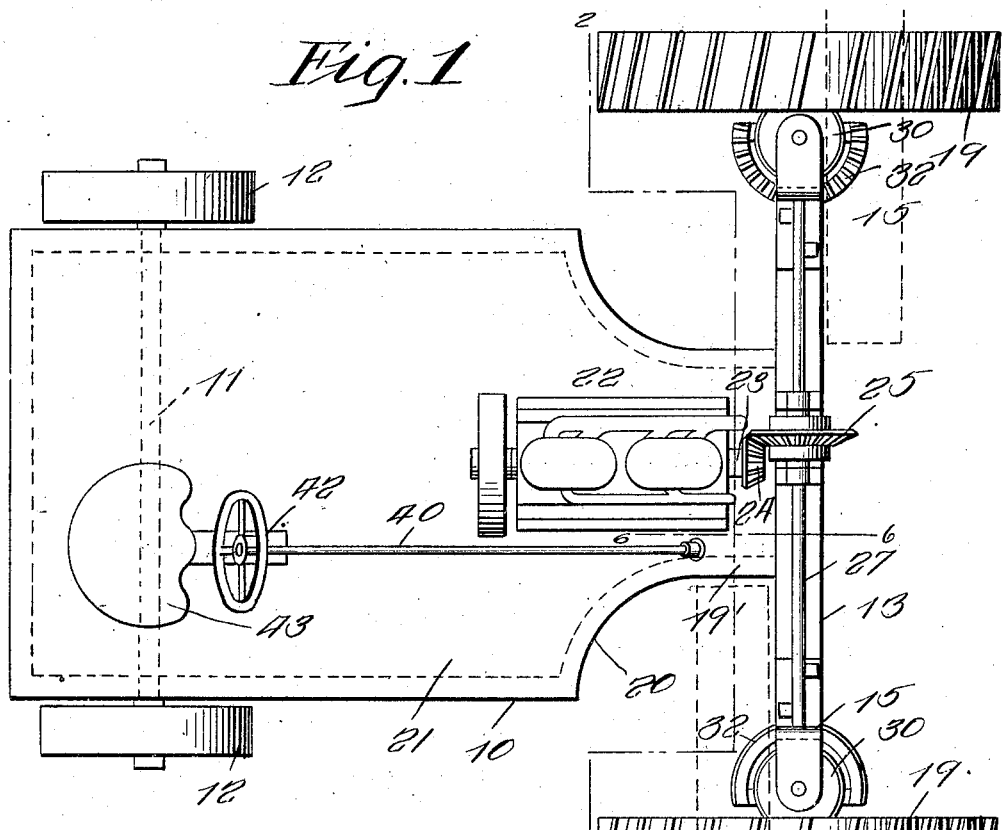
Figure 2:
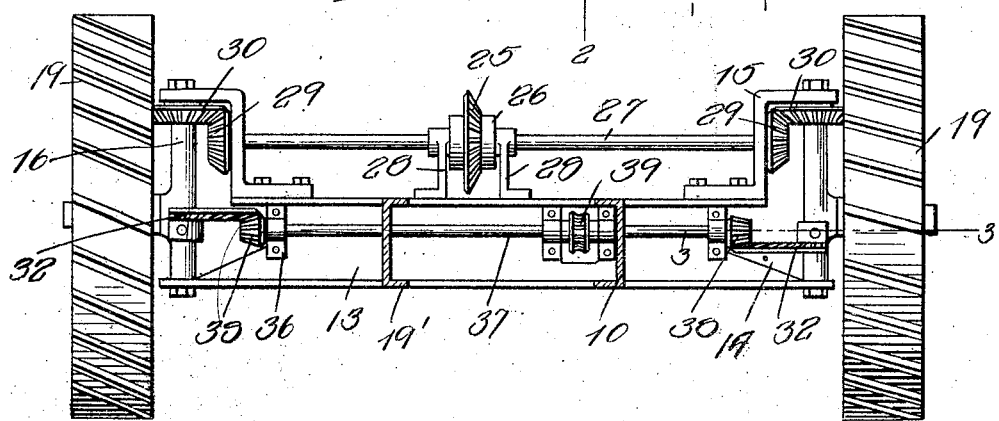

In the accompanying drawings, like characters of reference indicate like parts in the several views, and Figure 1 is a plan view of the tractor constructed in accordance with this invention. Fig. 2 is a section on the line 2—2 of Fig. 1. Fig. 3 is a section on the line 3—3 of Fig. 2. Fig. 4 is a detail view of the interior of one of the driving wheels. Fig. 5 is an enlarged detail showing one of the steering gears removed from the apparatus. Fig. 6 is a detail section on the line 6—6 of Fig. 1. Fig. 7 is a detail elevation of one of the steering axles. Fig. 8 is a detail plan of the axle shown in Fig. 7.

In carrying out the objects of this invention there is provided a frame 10 which is supported on the rear axles 11 mounted suitably beneath the frame and carrying the ground wheels 12. Across the front of the frame extends an I-beam 13 which has its ends cut away as at 14 so that a Z-shaped bracket 15 may be attached to the upper flange of the beam at each end and overhang the same as clearly seen in Fig. 2. The lower flange of the I-beam is provided with a circular opening which is in alinement with a similar opening in the overhanging part of the respective bracket 15.

At 16 is a vertical shaft which is square in cross section and is provided with cylindrical joints 17 fitted in the opening in the bracket and I-beam and similar openings at the opposite end of the beam. Projecting from each of the vertical shafts 16 is a stub axle 18 whereon is revolubly mounted a tractor wheel 19. By means of this arrangement the tractor wheel may swing bodily about the axis of the shaft 16 and in rear to permit such swinging movement the front of the frame 10 is connected to the beam 13 by a narrow neck 19' formed by curving the frame members inward as at 20. By means of this arrangement the tractor wheels may be caused to assume the position shown in dotted lines in Fig. 1.

The frame 10 is covered with the usual platform 21 and on this platform is mounted an engine 22 provided with a shaft 23. On this shaft 23 is a bevel pinion 24 which meshes with a bevel gear 25 forming part of the usual differential gearing indicated in general at 26. Extending from the differential gearing are the alined shafts 27 which are supported in the vertical portions of the brackets 15 and in bearings 28 on the beam 13. On each of these shafts 27 is a pinion 29 which meshes with an idler 30 carried on the respective vertical shaft 16. This pinion 30 meshes with a gear ring 31 on the respective traction wheel 19.

At 32 is a segmental bevel gear which is provided with a hub 33 having an open ended slot 34 therein so that this hub can be slipped over the respective shaft 16 and held when positioned thereon by a pin 35. Mounted in suitable bearings 36 on the beam 13 is a shaft 37 which is provided with pinions 38 meshing respectively with the segmental gears 32.

From an inspection of Fig. 2 it will be seen that one of these pinions mesh with a gear arranged above it while the other meshes with a gear arranged below it so that the rotation of the shaft 37 will move the ground wheels 19 in such manner that they will at all times remain parallel. On the shaft 37 is a worm wheel 39 and extending longitudinally of the machine in an upwardly and rearwardly direction is a steering post 40 whereon is a worm 41 which meshes with the worm wheel 39. On the upper end of this steering post is a steering wheel 42 located conveniently to the driver's seat 43. In the operation of this device it will be plain that when the engine is running the tractor wheels 19 will be actuated thereby and it will also be plain that movement of the steering wheel 42 will afford shifting of the traction wheels 19 about the axis of the vertical shafts 16. There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

In a device of the kind described, a frame, a pair of vertical shafts journaled at the front of said frame and each provided with a steering axle, a traction and steering wheel on each stub axle, means to drive said wheels, a segmental bevel gear provided with a hub having a slot engaging on each vertical shaft, a pin passing through each hub and vertical shaft, a transverse shaft journaled to said frame, a bevel pinion on each end of said shaft meshing with a respective segmental gear, one of said gears engaging the upper side of one pinion and the other gear engaging the lower side of the other pinion, and means to rotate said shaft.

In testimony whereof, I affix my signature, in the presence of two witnesses.

MARION M. BARNES.

Witnesses:
ELMER SMILEY,
OSCAR O. CONWELL.

---

Copies of this patent may be obtained for five cents each, by addressing the "Commissioner of Patents, Washington, D. C."